US012049596B2

(12) United States Patent
Mukherjee et al.

(10) Patent No.: US 12,049,596 B2
(45) Date of Patent: Jul. 30, 2024

(54) PROCESS FOR CONVERSION OF CRUDES AND CONDENSATES TO CHEMICALS UTILIZING A MIX OF HYDROGEN ADDITION AND CARBON REJECTION

(71) Applicant: LUMMUS TECHNOLOGY LLC, Houston, TX (US)

(72) Inventors: Ujjal K. Mukherjee, Montclair, NJ (US); Kandasamy Sundaram, Houston, TX (US)

(73) Assignee: LUMMUS TECHNOLOGY LLC, Houston, TX (US)

( * ) Notice: Subject to any disclaimer, the term of this patent is extended or adjusted under 35 U.S.C. 154(b) by 0 days.

(21) Appl. No.: 17/978,058

(22) Filed: Oct. 31, 2022

(65) Prior Publication Data

US 2023/0053229 A1    Feb. 16, 2023

Related U.S. Application Data

(62) Division of application No. 16/819,964, filed on Mar. 16, 2020, now Pat. No. 11,485,918.

(Continued)

(51) Int. Cl.
*C10G 69/00*     (2006.01)
*B01J 8/18*      (2006.01)
(Continued)

(52) U.S. Cl.
CPC ............ *C10G 69/06* (2013.01); *B01J 8/1827* (2013.01); *B01J 8/24* (2013.01); *B01J 19/245* (2013.01);
(Continued)

(58) Field of Classification Search
CPC . C10G 9/14; C10G 9/36; C10G 11/18; C10G 35/04; C10G 45/00; C10G 47/00;
(Continued)

(56) References Cited

U.S. PATENT DOCUMENTS

2018/0155639 A1    6/2018  Al-Ghamdi et al.
2018/0155642 A1*   6/2018  Al-Ghamdi ............ C10G 69/08

FOREIGN PATENT DOCUMENTS

TW         201614053 A      4/2016
WO    WO 2018065922     *   4/2018

OTHER PUBLICATIONS

Office Action issued in Taiwanese Application No. 109108650, mailed on Oct. 4, 2023 (7 pages).

* cited by examiner

*Primary Examiner* — Prem C Singh
*Assistant Examiner* — Brandi M Doyle
(74) *Attorney, Agent, or Firm* — Osha Bergman Watanabe & Burton LLP

(57) ABSTRACT

Processes herein may be used to thermally crack various hydrocarbon feeds, and may eliminate the refinery altogether while making the crude to chemicals process very flexible in terms of crude. In embodiments herein, crude is progressively separated into light and heavy fractions utilizing convection heat from heaters used in steam cracking. Depending on the quality of the light and heavy fractions, these are routed to one of three upgrading operations, including a fixed bed hydroconversion unit, a fluidized catalytic conversion unit, or a residue hydrocracking unit that may utilize either an ebullated bed reactor with extrudate catalysts or a slurry hydrocracking reactor using a homogeneous catalyst system, such as a molybdenum based catalysts which may optionally be promoted with nickel. Products from the upgrading operations can be finished olefins and/or aromatics, or, for heavier products from the upgrading operations, may be used as feed to the steam cracker.

13 Claims, 5 Drawing Sheets

Related U.S. Application Data

(60) Provisional application No. 62/830,122, filed on Apr. 5, 2019.

(51) Int. Cl.
*B01J 8/24* (2006.01)
*B01J 19/24* (2006.01)
*C10G 69/06* (2006.01)

(52) U.S. Cl.
CPC ... *B01J 2219/0004* (2013.01); *C10G 2400/20* (2013.01); *C10G 2400/30* (2013.01)

(58) Field of Classification Search
CPC ........ C10G 49/00; C10G 51/04; C10G 51/06; C10G 69/04; C10G 69/06; C10G 2400/20; C10G 2400/30; B01J 8/24; B01J 8/1827; B01J 19/245; B01J 2219/0004
See application file for complete search history.

PROCESS FOR CONVERSION OF CRUDES AND CONDENSATES TO CHEMICALS UTILIZING A MIX OF HYDROGEN ADDITION AND CARBON REJECTION

CROSS-REFERENCE TO RELATED APPLICATIONS

This application, pursuant to 35 U.S.C. § 119(e), claims priority to U.S. Provisional Application Ser. No. 62/830,122, filed Apr. 5, 2019, which is herein incorporated by reference in its entirety.

FIELD OF THE DISCLOSURE

Embodiments disclosed herein relate generally to the thermal cracking of hydrocarbon mixtures, such as whole crudes or other hydrocarbon mixtures, to produce olefins.

BACKGROUND

Hydrocarbon mixtures having an end boiling point over 550° C. are generally not processed directly in a pyrolysis reactor to produce olefins, as the reactor cokes fairly rapidly. While limiting reaction conditions may reduce the fouling tendency, the less severe conditions result in a significant loss in yield.

To date, most crude has been partially converted to chemicals in large refinery-petrochemicals complexes. The focus of the refinery is to produce transportation fuels such as gasoline and diesel. Low value streams from the refinery such as LPG and light naphtha are routed to petrochemicals complexes that may or may not be adjacent to the refinery. The petrochemicals complex then produces chemicals such as benzene, paraxylene, ethylene, propylene and butadiene. A typical complex of this kind is shown in FIG. 1.

In the conventional method, crude oil is desalted and preheated and sent to a crude oil distillation column. There, various cuts comprising, naphtha, kerosene, diesel, gasoil, vacuum gas oil (VGO) and residue are produced. Some cuts like naphtha and gas oils are used as feed to produce olefins. VGO and residue are hydrocracked to produce fuels. The products obtained from the crude tower (atmospheric distillation) and from the vacuum tower are used as fuel (gasoline, jet fuel, diesel, etc.) Generally, they do not meet fuel specifications. Therefore, isomerization, reforming, and/or hydroprocessing (hydrodesulfurization, hydrodenitrogenation, and hydrocracking) are done to these products before use as a fuel. Olefin plants may receive feeds before refining and/or after refining, depending upon the refinery.

The general consensus in the art is that hydrocarbon mixtures having a wide boiling range and/or hydrocarbons having a high end boiling point require an initial separation of the hydrocarbons into numerous fractions, such as gas/light hydrocarbons, naphtha range hydrocarbons, gas oil, etc., and then cracking each fraction under conditions specific for those fractions, such as in separate cracking furnaces. In special cases where the crude is extra light, typically with API>40, or when dealing with condensates, the refinery has been partially bypassed, such as by feeding the light crude directly to the convection section of heaters used in steam cracking in systems such as shown in FIG. 2. As illustrated, an extra light crude or condensate 10 may be heated in the convection zone 12 of a pyrolysis heater 14. The heated crude 16 may then be flashed in a flash drum 18 to recover a vapor phase 20 and a liquid phase 22. The vapor phase 20 may then be further heated and fed to a radiant section 24 of the pyrolysis heater 14 for conversion to an olefinic product 26. This scheme, while being able to process whole light crude or condensate, still has to rely on an adjacent refinery to handle the residual heavy product.

Referring now to FIG. 3, others have proposed hydroprocessing the whole crude in a fixed bed reactor system 28 to hydrogenate the feed and to reduce its specific gravity and end point. The hydroprocessed whole crude 30 is then sent to the convection section 12 of a pyrolysis heater and thence to a flash drum 18 as shown in FIG. 3, where like numerals represent like parts. This scheme would permit the processing of slightly heavier crudes compared to the extra light crudes and condensates of the FIG. 2 scheme, but has the following disadvantages: (i) the front end hydroprocessing will require many reactor trains and very large volumes of catalyst, and (ii) there is still the requirement for an upgrader for the heavy product.

SUMMARY OF THE DISCLOSURE

In contrast to the processes as exemplified by FIGS. 1-3, processes according to embodiments herein may eliminate the refinery altogether while making the crude to chemicals very flexible in terms of crude. In embodiments herein, crude is progressively separated into light and heavy fractions utilizing convection heat from heaters used in steam cracking. Depending on the quality of the light and heavy fractions, these are routed to one of three upgrading operations, including a fixed bed hydroconversion unit, a fluidized catalytic conversion unit, or a residue hydrocracking unit that may utilize either an ebullated bed reactor with extrudate catalysts or a slurry hydrocracking reactor using a homogeneous catalyst system, such as a molybdenum based catalysts which may optionally be promoted with nickel. Products from the upgrading operations can be finished olefins and/or aromatics, or, for heavier products from the upgrading operations, may be used as feed to the steam cracker.

Embodiments disclosed herein may eliminate the atmospheric and vacuum distillation steps associated with conventional refining processes, and instead utilize the heat in the convection section of pyrolysis heaters to facilitate separations. Embodiments herein utilize several different reactor platforms and catalyst systems to target the transformation of molecules in crude to those most suited for steam cracking to produce chemicals. While a single process, such as a residue hydrocracker or fixed bed hydrocracker or fluidized catalytic cracker could achieve some of the target transformation of molecules to steam cracker feed, the approach would result in inordinate amounts of energy, catalyst consumption, and poorer chemical yields from crude. Embodiments herein, however, stem from analysis of crude in terms of paraffins, naphthenes, and aromatics, rather than as distillation cuts known in industry typically as naphtha, kerosene, diesel, etc. Utilizing the knowledge of crude speciation to separate out the right species utilizing the correct temperature and pressure and convection heat, and then directing the separated fractions to the appropriate upgrading option that would maximize the yield of chemicals while sustaining continuous operation in line with long on-stream factor of a cracker.

In one aspect, embodiments disclosed herein relate to a system for processing whole crudes and other wide boiling and/or heavy hydrocarbon streams to produce olefins and/or aromatics. The system may include a flow line for transporting a wide boiling range hydrocarbon stream from a source. A pyrolysis reaction zone including one or more pyrolysis reactors may be provided, each pyrolysis reaction zone including a convection zone and a radiant heating zone, and a fractionation system. A first heating coil may be disposed in a convection zone of one of the one or more pyrolysis reactors, the heating coil being configured to heat the wide boiling range hydrocarbon stream. A first separation system may be used for separating the heated wide boiling range hydrocarbon stream into a first vapor fraction and a first liquid fraction. Similarly, a second heating coil may be disposed in a convection zone of one of the one or more pyrolysis reactors, where the second heating coil may be configured to heat the first liquid fraction. A second separation system may be provided for separating the heated first liquid fraction into a second vapor fraction and a second liquid fraction. Further still, a third heating coil may be disposed in a convection zone of one of the one or more pyrolysis reactors, the third heating coil being configured to heat the second liquid fraction. A third separation system may be provided for separating the heated wide boiling range hydrocarbon stream into a third vapor fraction and a third liquid fraction.

The system may also include a first radiant heating coil disposed in a radiant heating zone of one of the one or more pyrolysis reactors, the radiant heating coil being configured to thermally convert hydrocarbons in the first vapor fraction to lighter hydrocarbons. Similarly, a second radiant heating coil may be disposed in a radiant heating zone of one of the one or more pyrolysis reactors and configured to thermally convert hydrocarbons in the second vapor fraction to lighter hydrocarbons. Additionally, a third radiant heating coil may be disposed in a radiant heating zone of one of the one or more pyrolysis reactors and configured to thermally convert hydrocarbons in the third vapor fraction to lighter hydrocarbons. Flow lines are provided for feeding the converted first, second, and third vapor fractions to the fractionation system, which is configured to separate the converted first, second, and third vapor fractions into two or more hydrocarbon fractions.

A flow line is provided to feed at least a portion of the second vapor fraction to a hydrotreatment and hydrocracking zone for converting hydrocarbons in the second vapor fraction to lighter hydrocarbons. A flow line is also provided for feeding at least a portion of the third vapor fraction to a residue fluid catalytic cracking unit for converting hydrocarbons in the third vapor fraction to lighter hydrocarbons. Another flow line may be provided for feeding the third liquid fraction to a residue hydrocracking unit.

A separation system may be used for separating an effluent from the residue fluid catalytic cracking unit into a first light hydrocarbon fraction and a first heavy hydrocarbon fraction, and a flow line may be provided for feeding the first light hydrocarbon fraction to the hydrotreatment and hydrocracking zone. Another flow line may be used for feeding the first heavy hydrocarbon fraction to the residue fluid catalytic cracking unit. Still further, a flow line may be provided for feeding at least a portion of the effluent from the hydrotreatment and hydroracking zone to the first separation system. A separation system may also be provided for separating an effluent from the residue hydrocracking unit into a second light fraction and a second heavy fraction, where a flow line for feeding the second light fraction to the hydrotreatment and hydrocracking zone and a flow line for feeding the second heavy fraction to the residue hydrocracking unit may be provided.

In some embodiments, the system may further include one or more feed lines for providing one or more of the two or more hydrocarbon fractions from the fractionation system to the residue hydrocracking unit. In various embodiments, the system may also include one or more feed lines for providing one or more of the two or more hydrocarbon fractions from the fractionation system to the hydrotreatment and hydrocracking zone. A feed line may also be present for providing at least a portion of the effluent from the residue hydrocracking unit to the first separation system, in some embodiments.

Providing additional processing flexibility, one or more of a feed line for providing at least a portion of the effluent from the residue fluid catalytic cracking unit to the fractionation system, a feed line for providing a portion of the second liquid fraction to the residue fluid catalytic cracking unit, or a feed line for providing a portion of the second liquid fraction and/or the third vapor fraction to the hydrotreatment and hydrocracking zone may also be provided.

In some embodiments, a separation system is provided for separating an effluent from the hydrotreatment and hydrocracking zone into two or more fractions, including a light naphtha fraction and a heavy fraction. The light naphtha fraction may be fed as the at least a portion of the effluent from the hydrotreatment and hydroracking zone to the first separation system. A flow line may also be provided for feeding the heavy fraction to the residue fluid catalytic cracking unit.

The separation system for separating an effluent from the hydrotreatment and hydrocracking zone may be configured, in some embodiments, to separate the effluent from the hydrotreatment and hydrocracking zone into three or more fractions, including the light naphtha fraction, an aromatics-rich heavy naphtha fraction, and the heavy fraction. In such embodiments, the system may optionally include an aromatics unit for processing the aromatics-rich heavy naphtha fraction.

In another aspect, embodiments herein are directed toward a system for processing whole crudes and other wide boiling and/or heavy hydrocarbon streams to produce olefins and/or aromatics. The system may include a pyrolysis reaction zone including one or more pyrolysis reactors, each including a convection zone and a radiant heating zone, and a fractionation system. An iterative heating and separation system may be configured for: heating the wide boiling range hydrocarbon stream and separating the heated wide boiling range hydrocarbon stream into a first vapor fraction and a first liquid fraction; heating the first liquid fraction and separating the heated first liquid fraction into a second vapor fraction and a second liquid fraction; and heating the second liquid fraction and separating the heated second liquid fraction into a third vapor fraction and a third liquid fraction. A radiant coil disposed in the radiant heating zone may convert hydrocarbons in the first vapor fraction. A hydrotreatment and hydrocracking zone may convert hydrocarbons in the second vapor fraction. And, a residue fluid catalytic cracking system may convert hydrocarbons in the third vapor fraction. Lastly, a residue hydrocracking system may convert hydrocarbons in the third liquid fraction.

In some embodiments, the system may additionally include a flow line for feeding an effluent from the hydrotreatment and hydrocracking reaction zone to the iterative heating and separation system.

The hydrotreatment and hydrocracking zone may include hydrotreatment and hydrocracking reactors and a separation system for separating an effluent from the hydrotreatment and hydrocracking reactors to recover a first light fraction and a first heavy fraction.

A flow line may be provided for feeding the first heavy fraction to the residue fluid catalytic cracking system and a flow line for feeding the first light fraction to the iterative heating and separation system.

In some embodiments, the separation system for separating an effluent from the hydrotreatment and hydrocracking reactors may be further configured to recover a naphtha range fraction. In some of such embodiments, the system may also include a catalytic reforming zone for converting hydrocarbons in the naphtha range fraction to a reformate. An aromatics unit may be used for processing the reformate and to recover one or more aromatics product streams.

The residue fluid catalytic cracking system of some embodiments may include one or more reactors and a separation system for separating an effluent from the one or more reactors to recover a second light fraction and a second heavy fraction. A flow line may be provided for feeding the second light fraction to the fractionation system and a flow line for feeding the second heavy fraction to the residue hydrocracking system.

The residue hydrocracking system of some embodiments includes one or more hydrocracking reactors and a separation system for separating an effluent from the one or more hydrocracking reactors to recover a third light fraction and a third heavy fraction. A flow line may be provided for feeding the third light fraction to the hydrotreatment and hydrocracking zone and a flow line for feeding the third heavy fraction to the residue fluid catalytic cracking system.

In another aspect, embodiments herein relate to a process for converting whole crudes and other wide boiling and/or heavy hydrocarbon streams to produce olefins and/or aromatics. The process may include iteratively heating and separating a wide boiling range hydrocarbon stream, including: heating the wide boiling range hydrocarbon stream and separating the heated wide boiling range hydrocarbon stream into a first vapor fraction and a first liquid fraction; heating the first liquid fraction and separating the heated first liquid fraction into a second vapor fraction and a second liquid fraction; and heating the second liquid fraction and separating the heated second liquid fraction into a third vapor fraction and a third liquid fraction. The process may also include: thermally cracking the first vapor fraction; hydrotreating and hydrocracking the second vapor fraction; reacting the third vapor in a residue fluid catalytic cracking unit; and converting hydrocarbons in the third liquid fraction in a residue hydrocracking system.

In some embodiments, the process may include thermally cracking a portion of the second vapor fraction and thermally cracking a portion of the third vapor fraction. Further, the process may include separating the thermally cracked first, second, and third vapor fractions to recover two or more hydrocarbon fractions.

In yet another aspect, embodiments herein may be directed toward a system for processing whole crudes and other wide boiling and/or heavy hydrocarbon streams to produce olefins and/or aromatics. The system may include a flow line for transporting a wide boiling range hydrocarbon stream from a source, a pyrolysis reaction zone comprising one or more pyrolysis reactors, each including a convection zone and a radiant heating zone, and a fractionation system. A first heating coil disposed in a convection zone of one of the one or more pyrolysis reactors may be configured to heat the wide boiling range hydrocarbon stream, and a first separation system may be provided for separating the heated wide boiling range hydrocarbon stream into a first vapor fraction and a first liquid fraction. A second heating coil may be disposed in a convection zone of one of the one or more pyrolysis reactors and configured to heat the first liquid fraction, and a second separation system may be provided for separating the heated first liquid fraction into a second vapor fraction and a second liquid fraction. Further; a first radiant heating coil may be disposed in a radiant heating zone of one of the one or more pyrolysis reactors configured to thermally convert hydrocarbons in the first vapor fraction to lighter hydrocarbons recovered as a converted first vapor fraction. A second radiant heating coil may be disposed in a radiant heating zone of one of the one or more pyrolysis reactors configured to thermally convert hydrocarbons in the second vapor fraction to lighter hydrocarbons to recover a converted second vapor fraction. Flow lines may be provided for feeding the converted first and second vapor fractions to the fractionation system. The fractionation system may be configured to separate the converted first and second vapor fractions into two or more hydrocarbon fractions. A flow line may be used for feeding at least a portion of the second vapor fraction to a hydrotreatment and hydrocracking zone for converting hydrocarbons in the second vapor fraction to lighter hydrocarbons. Another flow line may be used for feeding at least a portion of the second liquid fraction to a catalytic reactor system for converting hydrocarbons in the second liquid fraction to lighter hydrocarbons. A separation system may be provided for separating an effluent from the catalytic reactor system into a first light hydrocarbon fraction and a first heavy hydrocarbon fraction; Further, a flow line for feeding the light hydrocarbon fraction to the hydrotreatment and hydrocracking zone may be provided, as well as a flow line for feeding at least a portion of the effluent from the hydrotreatment and hydroracking zone to the first separation system.

Other aspects and advantages will be apparent from the following description and the appended claims.

Figure 1:
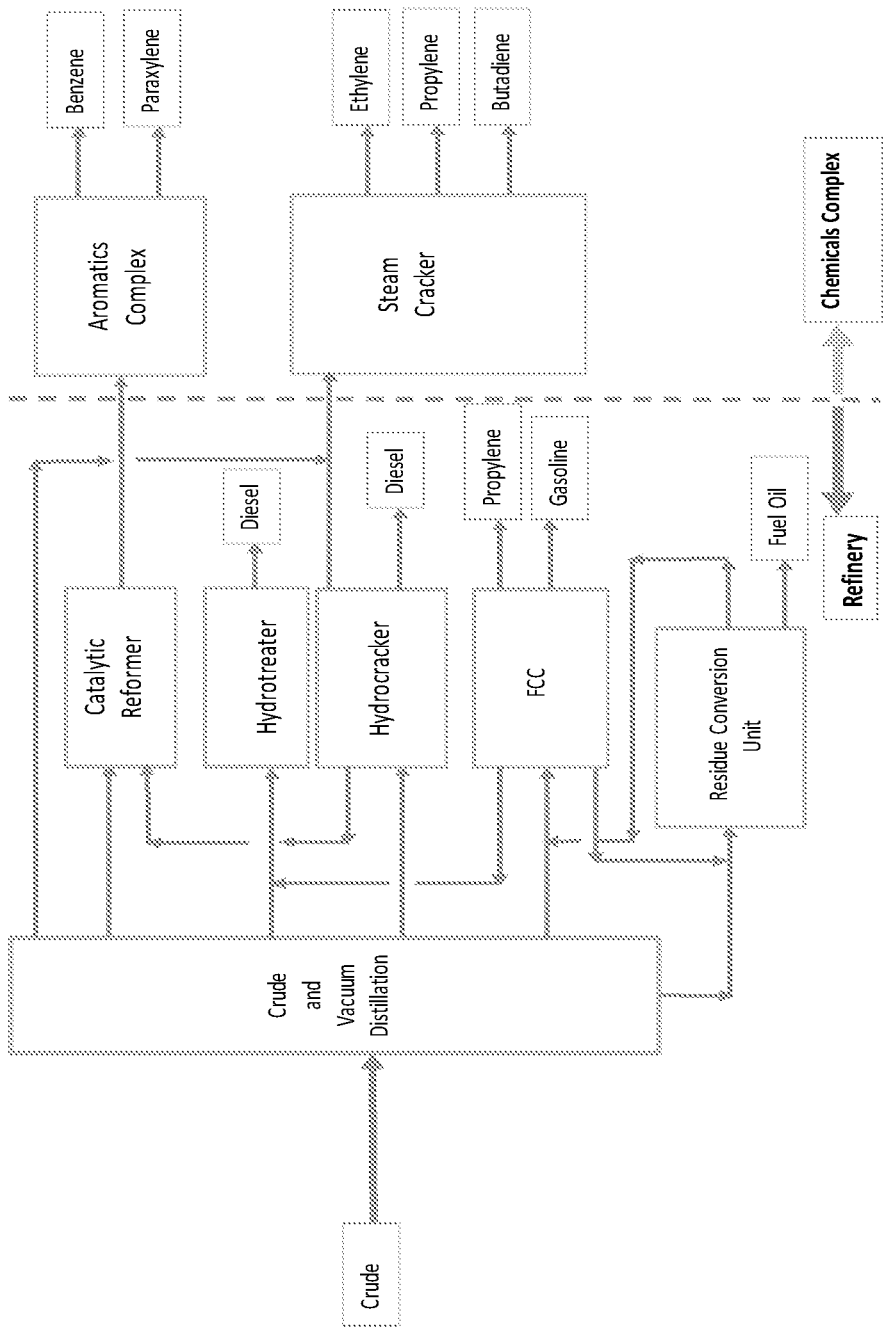
FIG. 1 is a simplified process flow diagram of a refinery and chemical complex typical of the prior art.
Figure 2:
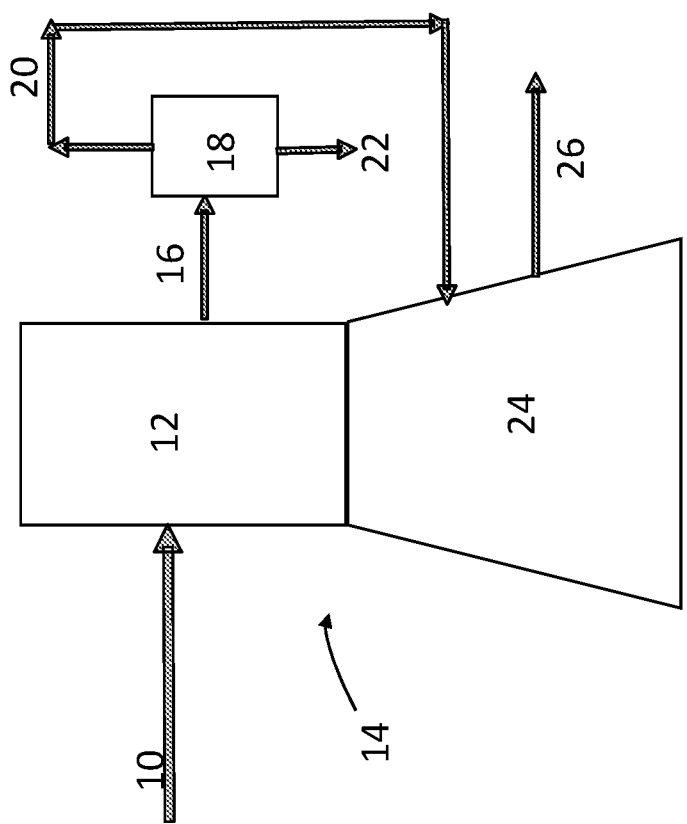
FIG. 2 is a simplified process flow diagram of a prior art system proposed for processing whole crude without pre-conditioning of the crude with the sole exception of desalting, which is required in every scheme.
Figure 3:
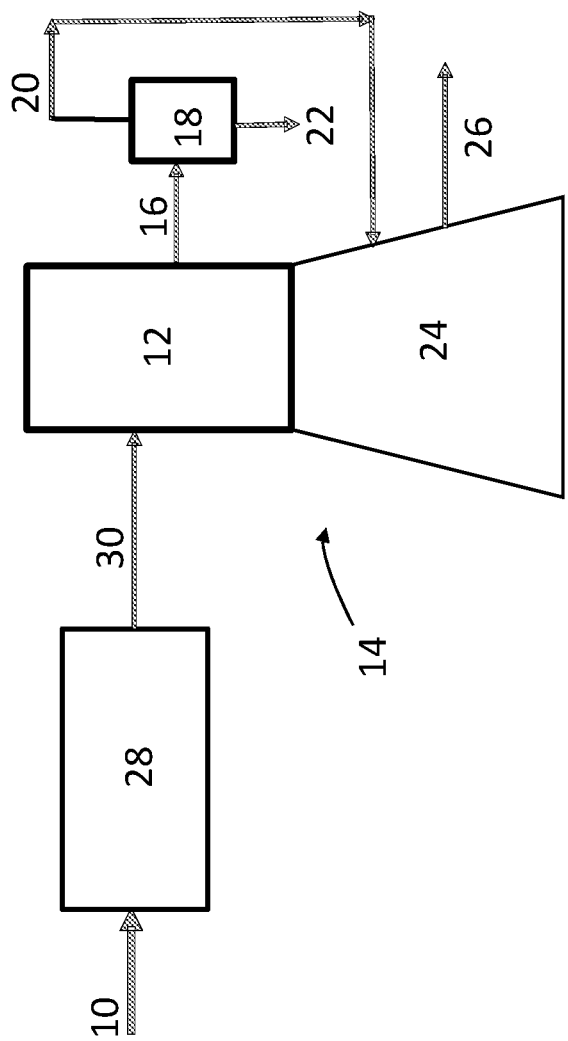
FIG. 3 is a simplified process flow diagram of a prior art system proposed for processing whole crude.

Simplified process flow diagrams herein may exclude pumps, controls, separators, distillation columns, and other equipment from the flow diagram. For example, a reaction zone may receive a feed and produce multiple effluent fractions, implying presence of a distillation column within the reaction zone for separating the product into desired fractions, providing internal recycle streams, etc. One skilled in the art can surely appreciate that the simplified process flow diagrams herein are not limited by the drawing itself, but should be interpreted in light of the following description.

DETAILED DESCRIPTION

Embodiments disclosed herein relate generally to the thermal cracking of hydrocarbon mixtures, such as whole crudes or other hydrocarbon mixtures, to produce olefins. In one aspect, embodiments disclosed herein relate to systems and processes for converting whole crudes and other heavy hydrocarbon containing streams to light olefins and aromatics. Embodiments herein relate to processes and systems that take crude oil and/or low value heavy hydrocarbons as feed and produces petrochemicals, such as light olefins (ethylene, propylene, and/or butenes) and aromatics. Embodiments disclosed herein may eliminate the refinery altogether, while making the crude to chemicals very flexible in terms of crude.

Hydrocarbon mixtures useful in embodiments disclosed herein may include various hydrocarbon mixtures having a boiling point range, where the end boiling point of the mixture may be greater than 500° C., such as greater than 525° C., 550° C., or 575° C. The amount of high boiling hydrocarbons, such as hydrocarbons boiling over 550° C., may be as little as 0.1 wt %, 1 wt % or 2 wt %, but can be as high as 10 wt %, 25 wt %, 50 wt % or greater. The description is explained with respect to crude oil, such as whole crude oil, but any high boiling end point hydrocarbon mixture can be used.

Processes disclosed herein can be applied to crudes, condensates and hydrocarbon with a wide boiling curve and end points higher than 500° C. Such hydrocarbon mixtures may include whole crudes, virgin crudes, hydroprocessed crudes, gas oils, vacuum gas oils, heating oils, jet fuels, diesels, kerosenes, gasolines, synthetic naphthas, raffinate reformates, Fischer-Tropsch liquids, Fischer-Tropsch gases, natural gasolines, distillates, virgin naphthas, natural gas condensates, atmospheric pipestill bottoms, vacuum pipestill streams including bottoms, wide boiling range naphtha to gas oil condensates, heavy non-virgin hydrocarbon streams from refineries, vacuum gas oils, heavy gas oils, atmospheric residuum, hydrocracker wax, and Fischer-Tropsch wax, among others. In some embodiments, the hydrocarbon mixture may include hydrocarbons boiling from the naphtha range or lighter to the vacuum gas oil range or heavier.

Notably, when the end boiling point of the hydrocarbon mixture is high, such as over 550° C., the hydrocarbon mixture cannot be processed directly in a pyrolysis reactor to produce olefins. The presence of these heavy hydrocarbons results in the formation of coke in the reactor, where the coking may occur in one or more of the convection zone preheating coils or superheating coils, in the radiant coils, or in transfer line exchangers, and such coking may occur rapidly, such as in few hours. Whole crude is not typically cracked commercially, as it is not economical. It is generally fractionated, and only specific cuts are used in a pyrolysis heater to produce olefins. The remainder is used in other processes. The cracking reaction proceeds via a free radical mechanism. Hence, high ethylene yield can be achieved when it is cracked at high temperatures. Lighter feeds, like butanes and pentanes, require a high reactor temperature to obtain high olefin yields. Heavy feeds, like gas oil and vacuum gas oil (VGO), require lower temperatures. Crude contains a distribution of compounds from butanes to VGO and residue (material boiling over 550° C.). Subjecting the whole crude without separation at high temperatures produces a high yield of coke (byproduct of cracking hydrocarbons at high severity) and plugs the reactor. The pyrolysis reactor has to be periodically shut down and the coke is cleaned by steam/air decoking. The time between two cleaning periods when the olefins are produced is called run length. When crude is cracked without separation, coke can deposit in the convection section coils (vaporizing the fluid), in the radiant section (where the olefin producing reactions occur) and/or in the transfer line exchanger (where the reactions are stopped quickly by cooling to preserve the olefin yields). Embodiments herein may address these concerns.

In processes according to embodiments herein, whole crude or other heavy hydrocarbon containing mixtures may be sent to a convection zone of a pyrolysis heater. Utilizing the heat from the pyrolysis heater convection section, the mixture is flashed in a first Enhanced Separation Device (ESD-1), and the vapor fraction (Cut 1) is sent to the convection zone of the pyrolysis heater after addition of steam. This light fraction is progressively heated with addition of incremental amounts of steam before being sent to the reaction section (radiant zone) of the pyrolysis heater for conversion of the Cut 1 fraction to olefins and other chemicals.

Pyrolysis reactors useful in embodiments herein may be tubular reactors with multiple coils fired in a radiant box. Each can be from 25 ft to 600 ft long and 1 inch to 8 inches in internal diameter. The heat may be supplied by burning gas and/or liquid fuels. Ambient air, preheated air, enriched air and/or gas turbine exhaust can be used as an air source. Coil outlet pressure may vary from 2 psig to 30 psig and coil outlet temperature may be in the range from 730° C. to 950° C. No catalyst is used in a pyrolysis reactor.

The liquid portion (Cut 2) from ESD-1 is further heated in the convection section of the pyrolysis heater or a second pyrolysis heater and flashed in a second enhanced separation device (ESD-2). The light fraction (Cut 3) can be progressively heated in the convection zone of the pyrolysis heater after incremental additions of dilution steam. Alternatively, or additionally, Cut 3 or a portion thereof may be sent to a fixed bed hydroconversion section for conversion of Cut 3 to hydrogen-rich naphtha and lighter fractions suitable for conversion to olefins and other petrochemicals in the pyrolysis heaters.

The liquid fraction (Cut 4) from ESD-2 is mixed with steam and heated with convection heat from a pyrolysis heater and incremental heat from a reboiler that is part of a third enhanced separation device (ESD-3). The light overhead fraction from ESD-3 (Cut 5), or a portion thereof, may be sent to a fluidized catalytic cracking (FCC) unit, which may include, for example, a zeolitic catalyst system designed to maximize propylene.

The liquid fraction (Cut 6) from ESD-3 may contain hydrocarbons typically boiling above 450° C. in some embodiments, above 500° C. in other embodiments, and above 565° C. in yet other embodiments. Cut 6 may be sent to a residue hydrocracking unit for conversion of the hydrocarbons in Cut 6 to lighter boiling fractions, such as ethane, propane, butanes, light and heavy naphtha, diesel-range material and VGO-range material.

In some embodiments, Cut 4, or a portion thereof, may be fed to a residue fluid catalytic cracking unit (RFCC). A RFCC unit may tolerate higher amounts of nitrogen and Conradson Carbon Residue in the feed. RFCC may be used, for example, when the starting crude is sufficiently high in hydrogen (high API) and relatively low in metals and CCR content.

In some embodiments, Cut 5 may be routed to a fixed bed hydroconversion unit for partial hydroconversion to naphtha and lighter fractions. The product naphtha and lighter fractions may be fed to the steam cracker, while the unconverted, hydrogen-rich fraction may be routed back to the FCC unit for enhanced propylene yield.

The residue hydrocracking unit may have an integrated hydrotreating section to reduce the sulfur and nitrogen of the fractions evolved from residue hydrocracking, and/or to enhance the hydrogen content of the fractions from residue hydrocracking, and/or to reduce the amount of heavy polynuclear aromatics in the liquid fractions. The effluent from the integrated hydrotreater may be fractionated. Lighter fractions may be routed to a fixed bed hydrotreating/hydrocracking section for further hydrotreatment and hydroconversion of the diesel range material to naphtha suitable as a steam cracker feed. In certain embodiments, the lighter fraction(s) can be directly sent to the steam cracker.

The hydrotreated VGO from the steam cracker and associated units may be sent to an FCC unit for conversion to light olefins and aromatics. Light Cycle Oil (LCO) from the FCC unit may be routed to the fixed bed hydrotreater/hydrocracker for conversion to naphtha and lighter components. The heavy aromatic-rich FCC Heavy Cycle Oil (HCO) may be used as an excellent diluent for use in the residue hydrocracking section. Low value pyrolysis oil from the steam cracker(s) may also be routed to the residue hydrocracking section, which may have the proper catalyst system and reactor platform (such as ebullated bed or slurry hydrocracking) to convert pyrolysis oil.

Embodiments herein having such an arrangement of units and processes therefore may have no effluent streams that are of low value. Hydrogen from the steam cracker may be routed to the reaction zones consuming hydrogen and thus minimizing hydrogen consumption of the overall process. Moreover, the inclusion of the FCC unit also minimizes hydrogen consumption while enhancing the yield of propylene.

In some embodiments of the process, such as where aromatics and olefin production are both valuable, the whole naphtha from the hydrotreating/hydrocracking zone may be split into a light naphtha fraction, rich in paraffins, and an aromatic-rich heavy naphtha stream. The light naphtha fraction may be routed to the steam cracker for excellent olefin yields, while the naphthene and aromatic rich heavy naphtha stream may be routed to a catalytic reforming section to maximize the production of aromatics.

As described above, embodiments herein may include (a) Enhanced Separation Devices, (b) a hydrotreatment/hydrocracking reaction zone, (c) a fluid catalytic cracking reaction zone, (d) a residue hydrocracking reaction zone, which may include an integrated hydrotreater system in some embodiments, (e) a steam cracker, including associated units such as an aromatics unit and one or more fractionators for recovering olefins such as ethylene, propylene, butenes, butadiene, as well as aromatics such as benzene, toluene, and xylenes. Embodiments herein may also include (f) a catalytic reforming unit.

Enhanced Separation Devices (a) according to embodiments herein may include a flash drum with a tangential inlet nozzle with features for separation of vapor and liquid. The drum may be equipped with steam injection nozzle(s). In some embodiments, such as for the first ESD (ESD-1), the flash drum may be equipped with demister pad(s) and/or a packed bed that can be refluxed, such as with a naphtha stream, and a separate return inlet nozzle may be provided for introduction of a light recycle stream (butane), from the olefins recovery section of the steam cracker. In other embodiments, such as for the second ESD (ESD-2), the flash drum may be equipped with at least one packed bed that can be refluxed with an oil stream, and a separate inlet nozzle may be provided for the introduction of an intermediate recycle stream, such as from the olefins recovery section of the steam cracker. In yet other embodiments, such as for the third ESD (ESD-3), the ESD may be a reboiled tower with separate stripping and rectification sections, may be equipped with provision for steam stripping and the addition of a kettle reboiler or a stab-in reboiler, as well as a provision for refluxing. In other embodiments, ESD-1 may be a simple flash drum with a demister pad, and ESD-2 or ESD-3 may be a packed or trayed tower, although there may be lower efficiency. In other embodiments, ESD 3 can be replaced by the use of the FCC Main Fractionator, which may separate out the heaviest fractions from the crude and the slurry oil and send the bottoms to the residue hydrocracking section.

The reaction zones (b)-(f) are generally known in the art, although not known to be arranged as provided in embodiments herein. The reaction zones may include one or more reactors, and, other than the steam cracker (pyrolysis) reaction zone, may include fixed bed reactor(s), ebullated bed reactor(s), slurry bed or moving bed reactors, or other types of reaction systems known in the art, in series or in parallel, and each may include catalysts useful for the intended reactions (hydrocracking, hydrotreatment, hydroprocessing, hydrodenitrogenation, Conradson Carbon Residue removal, hydrodesulfurization, aromatization, etc.).

Steam cracker (e), in some embodiments, may include one or more pyrolysis heaters, as well as convection zone coils, radiant zone coils, and transfer line exchangers, as needed. The steam cracker may also include one or more separators or distillation columns for separating the steam cracked product into desired hydrocarbon fractions, such as ethylene, propylene, butenes, butadienes, naphtha fraction(s), diesel fractions, VGO fractions, and pyrolysis gas fractions, among others. The steam cracker may also include associated units such as an aromatics unit and one or more fractionators for recovering the aromatics, such as benzene, toluene, and xylenes. The steam cracker, in some embodiments, may also include hydrogenation units for converting acetylenes and diolefins to olefins and paraffins.

By separating the whole crude or heavy hydrocarbon containing mixture into various boiling fractions, as described above, and integrating hydrotreatment, hydrocracking, fluid catalytic cracking, and residue hydrocracking, coking in each section of the steam cracker can be controlled, as well as by designing the equipment properly and controlling the operating conditions. In the presence of steam, the hydrocarbon mixture can be heated to high temperatures without coking in the convection section. Additional steam may be added to further vaporize the fluid adiabatically and/or may be further heated in the convection zone. Therefore, coking in the convection is minimized.

As different boiling cuts may be processed in independent coils, the severity for each cut can be controlled. This reduces the coking in the radiant coils and in the downstream transfer line exchangers (TLE's). Overall, olefin production is maximized compared to a single cut with heavy tails (high boiling residue) removed. Heavy oil processing schemes or conventional preheating of whole crude without various boiling fractions produces less total olefins than embodiments disclosed herein. In processes disclosed herein, any material with a low boiling point to any end point can be processed at optimal conditions for that material. One, two, three or more individual cuts can be performed for crude and each cut can be processed separately at optimum conditions.

Saturated and/or superheated dilution steam may be added at appropriate locations to vaporize the feed to the extent desired at each stage. Separations of the hydrocarbon mixture may be performed in enhanced separation devices to separate the hydrocarbons into various cuts. The vapor cuts may be processed in the steam cracker(s) and associated units. Alternatively, or additionally, the heavier vapor cuts may be processed in the hydrotreatment/hydrocracking reaction zone or the fluid catalytic cracking reaction zone prior to processing the resulting hydrocarbons in the steam cracker(s). Heavy tails may be processed in the residue hydrocracking unit prior to processing the resulting hydrocarbons in one or more of the hydrotreatment/hydrocracking reaction zone, the fluid catalytic cracking reaction zone, and/or the steam cracker(s).

The hydrocarbon mixtures may be preheated with waste heat from process streams, including effluents from the cracking process or flue gas from the pyrolysis reactor/heater. Alternatively, crude heaters can be used for preheating. In such cases, to maximize thermal efficiency of the pyrolysis reactor, other cold fluids (like boiler feed water (BFW) or air preheat or economizer) can be employed as the uppermost cold sinks of the convection section of the pyrolysis heater(s).

The process of cracking hydrocarbons in a pyrolysis reactor may be divided into three parts, namely a convection section, a radiant section, and a quench section, such as in a transfer line exchanger (TLE). In the convection section, the feed is preheated, partially vaporized, and mixed with steam. In the radiant section, the feed is cracked (where the main cracking reaction takes place). In the TLE, the reacting fluid is quickly quenched to stop the reaction and control the product mixture. Instead of indirect quenching via heat exchange, direct quenching with oil is also acceptable.

Embodiments herein efficiently utilize the convection section to enhance the cracking process. All heating may be performed in a convection section of a single reactor in some embodiments. In some embodiments, crude enters the top row of the convection bank and is preheated, with hot flue gas generated in the radiant section of the heater, at the operating pressure to medium temperatures without adding any steam. The outlet temperatures typically vary from 150° C. to 400° C., depending upon the crude and throughput. At these conditions, 5 to 70% of the crude may be vaporized. For example, the outlet temperature of this first heating step may be such that naphtha (boiling at about 200° C. in the ASTM curve) is vaporized. Because the hydrocarbon mixture is preheated with hot flue gas generated in the radiant section of the heater, limited temperature variations and flexibility in the outlet temperature can be expected.

In some embodiments, up to 95% of the crude may be vaporized, such as 5% to 95% of the crude. The vapor fraction may depend, as noted above, on the crude. For example, for Arab light, stream 60 may contain 15-30 wt % of the crude, stream 74 may contain 15-30 wt % of the crude, and stream 84 may contain 15-25 wt % of the crude. The amount of vapor will vary depending upon the amount steam injected in to the ESDs.

The preheated hydrocarbon mixture enters an enhanced separation device for separation of the vaporized portion (Cut 1) from the unvaporized portion (Cut 2). The vapors (Cut 1) may go to further superheating, mixed with dilution steam, and fed to the radiant coil for cracking. The naphtha cut (or light hydrocarbon fraction, Cut 1) and dilution steam mixture is further superheated in the convection section and enters the radiant coil. The radiant coils can be in different cells, or a group of radiant coils in a single cell can be used to crack the naphtha and lighter fractions. The amount of dilution steam can be controlled to minimize the total energy. Typically, the steam to light hydrocarbon fraction is controlled at a steam to oil ratio of about 0.5 w/w, where any value from 0.2 w/w to 1.0 w/w, such as 0.3 w/w to 0.7 w/w, is acceptable. Cut 1 in some embodiments may include C1-C9 hydrocarbons, such as hydrocarbons boiling in the range of C1 to C7, C1 to C8, or C1 to C9, in various embodiments. For example, Cut 1 may include hydrocarbons boiling up to a Cut 1 end boiling point in the range from about 155° C. to about 210° C., such as an end boiling point of 160° C., 170° C., 180° C., 190° C., 200° C., or 210° C. Some embodiments may, for example, prefer to exclude the higher boiling C8 and/or C9 aromatics from Cut 1. The heat for the ESD may be provided by the heat from the convection zone of the pyrolysis heater. Steam is introduced to reduce hydrocarbon partial pressure and reduce fouling in convection tubes.

The liquid (feed that is not vaporized, Cut 2) from the enhanced separation device may be mixed with small amounts of dilution steam and further heated in the convection section. The S/O (steam to oil ratio) for this coil can be about 0.1 w/w, where any value from 0.05 w/w to 1.0 w/w may be acceptable. As this steam will also be heated along with Cut 2, there is no need to inject superheated steam. Saturated steam is adequate. There is no harm in injecting superheated steam in place of saturated steam, however. Addition of steam and heating in the convection section may vaporize a portion of the hydrocarbons in Cut 2. The heated/partially vaporized Cut 2 may then be fed to an enhanced separation device for separation of the vaporized portion (Cut 3) from the unvaporized portion (Cut 4). The vapors (Cut 3), or a portion thereof, may go to further superheating, mixed with dilution steam, and fed to the radiant coil for cracking. Cut 3 in some embodiments may be C9-C16 hydrocarbons, such as hydrocarbons boiling in the range of C7, C8, or C9 to C15, C16, or C17, in various embodiments. For example, Cut 3 may include hydrocarbons boiling in the range from a Cut 1 end boiling point (a Cut 3 initial boiling point) up to a Cut 3 end boiling point in the range from about 270° C. to about 310° C., such as an end boiling point of 270° C., 275° C., 280° C., 290° C., 300° C., or 310° C. The heat for the ESD may be provided by the heat from the convection zone of the pyrolysis heater. The heat for the ESD is provided by the heat from the convection zone of the pyrolysis heater. Steam is introduced to reduce hydrocarbon partial pressure and reduce fouling in convection tubes.

The liquid Cut 4 from the second enhanced separation device may be mixed with small amounts of dilution steam and further heated in the convection section. The S/O (steam to oil ratio) for this coil can be about 0.1 w/w, where any value from 0.05 w/w to 1.0 w/w may be acceptable. As this steam will also be heated along with Cut 4, there is no need to inject superheated steam. Saturated steam is adequate. There is no harm in injecting superheated steam in place of saturated steam, however. Addition of steam and heating in the convection section may vaporize a portion of the hydrocarbons in Cut 4. The heated/partially vaporized Cut 4 may then be fed to a third enhanced separation device for separation of the vaporized portion (Cut 5) from the unvaporized portion (Cut 6). The vapors (Cut 5), or a portion thereof, may go to further superheating, mixed with dilution steam, and be fed to the radiant coil for cracking. The third enhanced separation device may include the capability of refluxing and may include a reboiler in some embodiments. Cut 5 in some embodiments may be C15-C30 hydrocarbons, such as hydrocarbons boiling in the range of C15, C16, or C17 to C28, C30, or C32, in various embodiments. For example, Cut 5 may include hydrocarbons boiling in the range from a Cut 3 end boiling point (a Cut 5 initial boiling point) up to a Cut 5 end boiling point in the range from about 370° C. to about 480° C., such as an end boiling point of 380° C., 400° C., 420° C., 430° C., 440° C., or 460° C. The heat for the ESD is provided by the heat from the convection zone of the pyrolysis heater and optionally the incremental reboiler. Steam is introduced to reduce hydrocarbon partial pressure and reduce fouling in convection tubes.

For most crude, the end boiling point is high and it will never be vaporized at the outlet of the last of the convection zone heating coils. Typical outlet temperatures of the last convection zone heating coil may be in the range from about 300° C. to 500° C., such as about 400° C., which may set the Cut 5 end boiling point (Cut 6 initial boiling point). The outlet temperature may be chosen to minimize coking in the convection zone coils. The amount of steam added to the streams to be vaporized such that minimum dilution steam flow is used and maximum outlet temperature is obtained without coking. Since some steam is present, coking is suppressed. For high coking crudes, higher steam flow is preferred.

To avoid any condensation of vapors in the lines fed to the radiant coils, a small amount of superheated dilution steam can be added to the vapor side outlet of the enhanced separation devices. This will avoid condensing of heavy material in the lines, avoiding these from turning into coke.

The unvaporized liquid (Cut 6) may be further processed in a residue hydrocracking unit. In some embodiments, Cut 6 may be co-processed with other heavy hydrocarbon feeds, such as pyrolysis oil recovered from the steam cracker product separations, or other heavy hydrocarbon streams resulting from processing in systems herein or provided from an external source.

In some embodiments, all or a portion of Cut 3 may be fed along with hydrogen to a hydrotreatment/hydrocracking reaction zone. The hydrotreatment or hydrocracking of Cut 3 may result in the hydroconversion of hydrocarbons therein to hydrogen-rich naphtha and lighter fractions suitable for conversion to olefins and other petrochemicals in the steam cracker(s). Accordingly, the effluent or products from the hydrotreatment/hydrocracking reaction zone may be fed to one or more of the first enhanced separation device along with the whole crude, or to the second enhanced separation device along with Cut 2, for example.

In some embodiments, all or a portion of Cut 5 may be fed to a fluid catalytic cracking (FCC) reaction zone. The FCC reaction zone may include one or more types of catalyst, such as Y type zeolite, ZSM-5, or many others useful for converting the hydrocarbons in Cut 5 to olefins, such as ethylene and propylene. In some embodiments, the catalyst may be a zeolitic catalyst system designed to maximize propylene, such as ZSM-5.

As noted above, the unvaporized liquid (Cut 6) may be further processed in a residue hydrocracking unit for conversion of the fraction to lighter boiling fractions such as ethane, propane, butanes, light and heavy naphtha, diesel-range material and VGO-range material. The residue hydrocracking unit may have an integrated hydrotreating section to reduce the sulfur and nitrogen of the fractions evolved from residue hydrocracking and to enhance the hydrogen content of the fractions from residue hydrocracking and also to reduce the amount of heavy polynuclear aromatics in the liquid fractions. The effluent from the integrated hydrotreater is fractionated. Lighter fractions are routed to the fixed bed hydrotreating/hydrocracking section for further hydrotreatment and hydroconversion of the diesel range material to naphtha suitable for steam cracker. In certain embodiments, the lighter fraction can be directly sent to the steam cracker. The hydrotreated VGO may be sent to the FCC unit for conversion to light olefins and aromatics. Light Cycle Oil (LCO) from the FCC unit is routed to the fixed bed hydrotreater/hydrocracker for conversion to naphtha and lighter components. The heavy aromatic-rich FCC Heavy Cycle Oil (HCO) is an excellent diluent in the residue hydrocracking section and is routed there. Low value pyrolysis oil from the steam cracker is also routed to the residue hydrocracking section, which has the right catalyst system and reactor platform (ebullated bed or slurry hydrocracking) to convert pyrolysis oil.

The radiant coil technology can be any type with bulk residence times ranging from 90 milliseconds to 1000 milliseconds with multiple rows and multiple parallel passes and/or split coil arrangements. They can be vertical or horizontal. The coil material can be high strength alloys with bare and finned or internally heat transfer improved tubes. The heater can consist of one radiant box with multiple coils and/or two radiant boxes with multiple coils in each box. The radiant coil geometry and dimensions and the number of coils in each box can be the same or different. If cost is not a factor, multiple stream heaters/exchangers can be employed.

Following cracking in the radiant coils, one or more transfer line exchangers may be used to cool the products very quickly and generate super high pressure steam. One or more coils may be combined and connected to each exchanger. The exchanger(s) can be double pipe or multiple shell and tube exchanger.

Instead of indirect cooling, direct quenching can also be used. For such cases, oil may be injected at the outlet of the radiant coil. Following the oil quench, a water quench can also be used. Instead of oil quench, an all water quench is also acceptable. After quenching, the products are sent to a recovery section.

Figure 4:
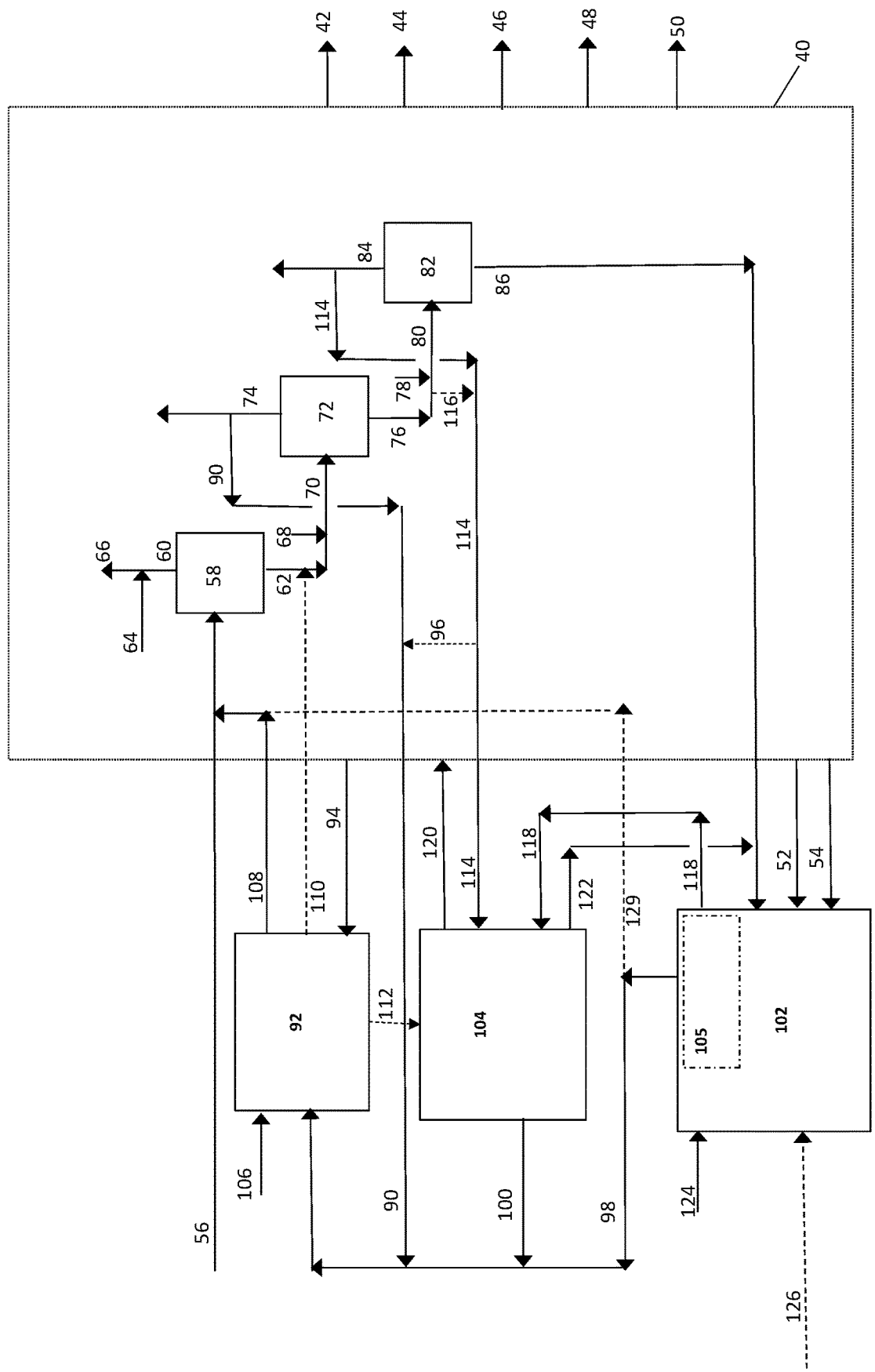
FIG. 4 is a simplified process flow diagram of a system for processing whole crudes and other heavy hydrocarbons according to embodiments herein.

FIG. 4 illustrates a simplified process flow diagram of a process for converting whole crudes and other heavy hydrocarbon containing mixtures to olefins and aromatics according to embodiments herein. To simplify the illustration, reference number 40 is indicative of a steam cracker (pyrolysis) unit and associated equipment, which may include one or more fired tubular furnaces, which may each be used for indirect heating of steam and/or the whole crude or fractions thereof, and for cracking hydrocarbons to ethylene and other olefinic compounds. The fired tubular furnaces have a convection section or zone and a cracking section or zone. The furnaces also contain one or more process tubes (radiant coils) through which the hydrocarbons fed through a hydrocarbon feed line are cracked to produce product gases upon the application of heat. Radiant and convective heat is supplied by combustion of a heating medium introduced to the cracking section of the furnace through heating medium inlets, such as hearth burners or wall burners, and exiting through an exhaust. The heater can be fired with 100% floor burners, 100% wall burners, or combinations thereof. The steam cracker unit may also include transfer line exchangers to quench the radiant coil effluent, as well as one or more fractionators, extractive distillation columns, etc., for separating the steam cracker effluent into two or more hydrocarbon fractions, such as ethylene fraction 42, propylene fraction 44, benzene fraction 46, mixed xylenes fraction 48, butadiene fraction 50, hydrogen fraction 52, and pyrolysis gas fraction 54. The simplified flow diagram does not illustrate the equipment or associated flows, but are well understood by those skilled in the art.

The hydrocarbon feedstock 56, such as a whole crude or a hydrocarbon mixture including hydrocarbons boiling from naphtha range hydrocarbons to hydrocarbons having a normal boiling point temperature greater than 550° C., for example, may be introduced to a heating coil (not shown), disposed in the convective section of the pyrolysis heater 40.

In the heating coil, the hydrocarbon feedstock may be partially vaporized, vaporizing the lighter components in the hydrocarbon feedstock, such as naphtha range hydrocarbons and lighter (such as C1-C9 hydrocarbons). The heated hydrocarbon feedstock is then fed to an enhanced separation device 58 for separation into a vapor fraction 60 and a liquid fraction 62.

Steam may be supplied to the process via multiple flow lines. Various portions of the process may use low temperature or saturated steam, while others may use high temperature superheated steam. Steam to be superheated may be fed via flow lines into heating coils, heated in the convection zone of the pyrolysis heater, and recovered via one or more flow lines as superheated steam.

A portion of the steam may be fed via flow line 64 and mixed with vapor fraction 60 to form a steam/hydrocarbon mixture in line 66. The steam/hydrocarbon mixture in stream 66 may then be fed to a heating coil (not shown) of the pyrolysis heater 40 to be superheated. The resulting superheated mixture may then be fed to a cracking coil disposed in a radiant zone of the pyrolysis heater. The cracked hydrocarbon product may then be recovered for heat recovery, quenching, and product recovery.

The liquid fraction 62 may be mixed with steam 68 and fed to a heating coil disposed in the convective zone (not shown) of the pyrolysis reactor 40. In the heating coil, the liquid fraction may be partially vaporized, vaporizing the remaining lighter components in the hydrocarbon feedstock, such as mid to gas oil range hydrocarbons. The injection of steam into the liquid fraction 62 may help prevent formation of coke in the heating coil. The heated liquid fraction 70 is then fed to a second enhanced separation device 72 for separation into a vapor fraction 74 and a liquid fraction 76.

A portion of the superheated steam (not shown) may be mixed with vapor fraction 74 to form a steam/hydrocarbon mixture. The steam/hydrocarbon mixture may then be fed to a heating coil (not shown). The resulting superheated mixture may then be fed to a cracking coil disposed in a radiant zone of a pyrolysis heater in reaction zone 40. The cracked hydrocarbon product may then be recovered for heat recovery, quenching, and product recovery along with products recovered from cracking of vapor fraction 66.

Superheated steam can be injected via flow lines (not shown) directly into one or both of enhanced separation devices 58, 72. The injection of superheated steam into the enhanced separation devices may reduce the partial pressure and increase the amount of hydrocarbons in the vapor fractions 60, 74.

The liquid fraction 76 may be mixed with steam 78 and fed to a heating coil disposed in the convective zone (not shown) of the pyrolysis reactor 40. In the heating coil, the liquid fraction may be partially vaporized, vaporizing additional components in the hydrocarbon feedstock, such as vacuum gas oil range hydrocarbons. The injection of steam into the liquid fraction 76 may help prevent formation of coke in the heating coil. The heated liquid fraction 80 is then fed to a third enhanced separation device 82 for separation into a vapor fraction 84 and a liquid fraction 86.

A portion of the superheated steam (not shown) may be mixed with vapor fraction 84 to form a steam/hydrocarbon mixture. The steam/hydrocarbon mixture may then be fed to a heating coil (not shown). The resulting superheated mixture may then be fed to a cracking coil disposed in a radiant zone of a pyrolysis heater in reaction zone 40. The cracked hydrocarbon product may then be recovered for heat recovery, quenching, and product recovery along with products recovered from cracking of vapor fractions 66, 74. Superheated steam may also be introduced to the enhanced separation device to facilitate separations, as well as to the recovered vapor fraction to prevent condensation in the transfer lines prior to introducing the vapor fraction to cracking coils to produce olefins. Further, enhanced separation device 82 may be a reboiled and refluxed separation device, (ESD-3), as described above. The liquid fraction 86 recovered from the separator may include the heaviest boiling components of the feed hydrocarbon mixture, such as hydrocarbons having a normal boiling point temperature of greater than 550° C. Pyrolysis unit 40 may include, in some embodiments, more than one pyrolysis heater. ESD1, ESD2, and ESD3, for example, may be connected to different heaters. Further, in some embodiments, the overhead streams can feed more than one pyrolysis heater.

In addition to heating the hydrocarbon and steam streams, the convection zone of the pyrolysis heater may be used to heat other process streams and steam streams. For example, coils may be used to heat BFW (Boiler feed water) and preheating SHP (super high pressure) steam, among others. The placement and number of coils can vary depending upon the design and the expected feedstocks available. In this manner, the convection section(s) may be designed to maximize energy recovery from the flue gas. Cracking of the lighter hydrocarbons may be carried out at higher severity, and by locating the superheating coils appropriately, cracking conditions may be enhanced or tailored to the specific vapor cut 60, 74, 84. These streams may be fed to a single pyrolysis heater or multiple pyrolysis heaters.

In some embodiments, enhanced separation device 58 may include a flash drum with a tangential inlet nozzle with features for separation of vapor and liquid. The drum may be equipped with steam injection nozzle(s). In some embodiments, such as for the first ESD 58, the flash drum may be equipped with demister pad(s) and/or a packed bed that can be refluxed, such as with a naphtha stream, and a separate return inlet nozzle may be provided for introduction of a light recycle stream (butane), from the olefins recovery section of the steam cracker.

In some embodiments, enhanced separation device 72 may include a flash drum with a tangential inlet nozzle with features for separation of vapor and liquid. The drum may be equipped with steam injection nozzle(s). In some embodiments, such as for the second ESD 72, the flash drum may be equipped with at least one packed bed that can be refluxed with an oil stream, and a separate inlet nozzle may be provided for the introduction of an intermediate (diesel, LCO) recycle stream, such as from the olefins recovery section of the steam cracker.

In some embodiments, enhanced separation device 82 may include a reboiled tower with separate stripping and rectification sections. ESD 82 may be equipped with provision for steam stripping and the addition of a kettle reboiler or a stab-in reboiler, as well as a provision for refluxing.

A portion of vapor stream 74 may be withdrawn and routed via flow line 90 to hydrotreatment/hydrocracking reaction zone 92. Further, mid to gas oil range hydrocarbons recovered from the product recovery section of the pyrolysis reaction zone 40 may be fed via flow line 94 to hydrotreatment/hydrocracking reaction zone 92. Additionally, or alternatively, vacuum gas oil range hydrocarbons (such as stream 96, which may be a portion of stream 84) or other suitable hydrocarbon fractions 98, 100 recovered from the residue hydrocracking unit 102 or the residue FCC unit 104, respectively, may be fed to and co-processed in the hydrotreatment/hydrocracking reaction zone 92. In hydrotreatment/hydrocracking reaction zone 92, the hydrocarbons may be mixed with hydrogen 106 and contacted with a catalyst to convert a portion of the hydrocarbons therein.

The reaction product from the hydrotreatment/hydrocracking reaction zone 92 may be fed, in some embodiments, via flow line 108 to the first ESD 58 for separation and processing in the steam cracker reaction zone 40. In other embodiments, hydrotreatment/hydrocracking reaction zone 92 may include one or more separators or fractionators for recovering and recycling hydrogen (internal, not shown), and or to recover one or more light hydrocarbon fractions 108, mid-range hydrocarbon fraction 110, and a heavy hydrocarbon fraction 112. Light hydrocarbon fraction 108 may be fed to ESD 58, while fraction 110 may be fed to ESD 72 and heavy fraction 112 may be fed to residue FCC unit 104, for example. Light hydrocarbon fraction 108 may include C2-C4 olefins and naphtha range hydrocarbons, for example. In some embodiments, stream 110 may include hydrocarbons boiling above about 150° C. to about 350° C., and stream 112 may include hydrocarbons boiling above about 350° C.

A portion of vapor stream 84 may be withdrawn and routed via flow line 114 to residue FCC unit 104. As noted above, a portion of this stream may be fed in some embodiments via flow line 96 to hydrotreatment/hydrocracking reaction zone 92. In some embodiments, a portion of liquid fraction 76 recovered from ESD 72 may be withdrawn and fed via flow line 116 to residue FCC unit 104. Likewise, residue FCC unit may receive appropriate hydrocarbon fractions 112, 118 from hydrotreatment/hydrocracking reaction zone 92 and residue hydrocracking reaction zone 102, respectively. In residue FCC reaction zone 104, the hydrocarbons may be contacted with a catalyst to convert a portion of the hydrocarbons therein.

The reaction product from the residue FCC unit 104 may be fed, in some embodiments, via flow line 120 for separation and processing in the steam cracker product recovery zone (internal to 40, not shown), for separation and recovery of the olefins and other reaction products. Residue FCC unit 104 may include one or more separators or fractionators for recovering (internal, not shown), and/or to recover one or more light hydrocarbon fractions 120, mid-range hydrocarbon fraction 100, and a heavy hydrocarbon fraction 122. Light hydrocarbon fraction 120 may be fed to the steam cracker product recovery zone, while fraction 100 may be fed to hydrotreatment/hydrocracking reaction zone 92, and heavy fraction 122 may be fed to residue hydrocracking unit 102, for example. Stream 120 may include, for example, paraffins, C2-C4 olefins, and aromatics, stream 100 may include LCO, and stream 120 may include heavy cycle oil (HCO).

Liquid stream 86 may be routed to residue hydrocracking unit 102, which may include an integrated hydrotreater 105 in some embodiments. Residue hydrocracking unit 102 may also receive hydrocarbon stream 122 from the residue FCC unit 104, as well as pyrolysis gas oil 54 from the steam cracker product recovery zone and/or a fuel oil feed stream 126. Hydrogen 52 may also be provided from the steam cracker product recovery zone, and additional hydrogen as needed may be supplied via flow line 124. In residue hydrocracking reaction zone 102, the hydrocarbons may be mixed with hydrogen 124, 52 and contacted with a catalyst to convert a portion of the hydrocarbons therein.

The reaction product from the residue hydrocracking unit 102 may be fed, in some embodiments, via flow line 129 for separation and processing in ESD 58 and thence to cracking coils, etc., or in the steam cracker product recovery zone (internal to 40, not shown), for separation and recovery of the olefins and other reaction products. Residue hydrocracking unit 102 may include one or more separators or fractionators for recovering (internal, not shown), and/or to recover one or more light hydrocarbon fractions 98, mid-range hydrocarbon fraction 118, and a heavy hydrocarbon fraction (internal recycle, for example). Light hydrocarbon fraction 98 may be fed to the hydrotreatment/hydrocracking reaction zone 92, and fraction 118 may be fed to residue FCC unit 104, for example. Stream 98 may include, for example, C2-C4 olefins, naphtha, and diesel range hydrocarbons, and stream 118 may include vacuum gas oil, for example.

Steam has a very low heat capacity, and the heat of vaporization of oil is also significant. Further, the heat energy available in the convection zone of a pyrolysis reactor is not infinite, and the multiple tasks of volatilizing the hydrocarbon feed, superheating steam, and superheating the hydrocarbon/steam mixtures to the radiant coils, may result in rejection of a high amount of high boiling material. A separate heater may be used to preheat the hydrocarbon feedstock and/or dilution steam, resulting in the overall process having a higher degree of flexibility in processing hydrocarbon mixtures having both low and high amounts of heavier hydrocarbons and improving the overall olefin yield from the hydrocarbon mixture.

Three enhanced devices are shown in FIG. 4 as an example. Depending upon the crude and processing units, one ESD can be used to produce a light fraction and a heavy fraction. The light fraction may be processed in the pyrolysis heaters and/or fixed bed hydrocracking unit. The heavy fraction may be processed in resid hydrocessing and/or resid FCC unit.

Figure 5:
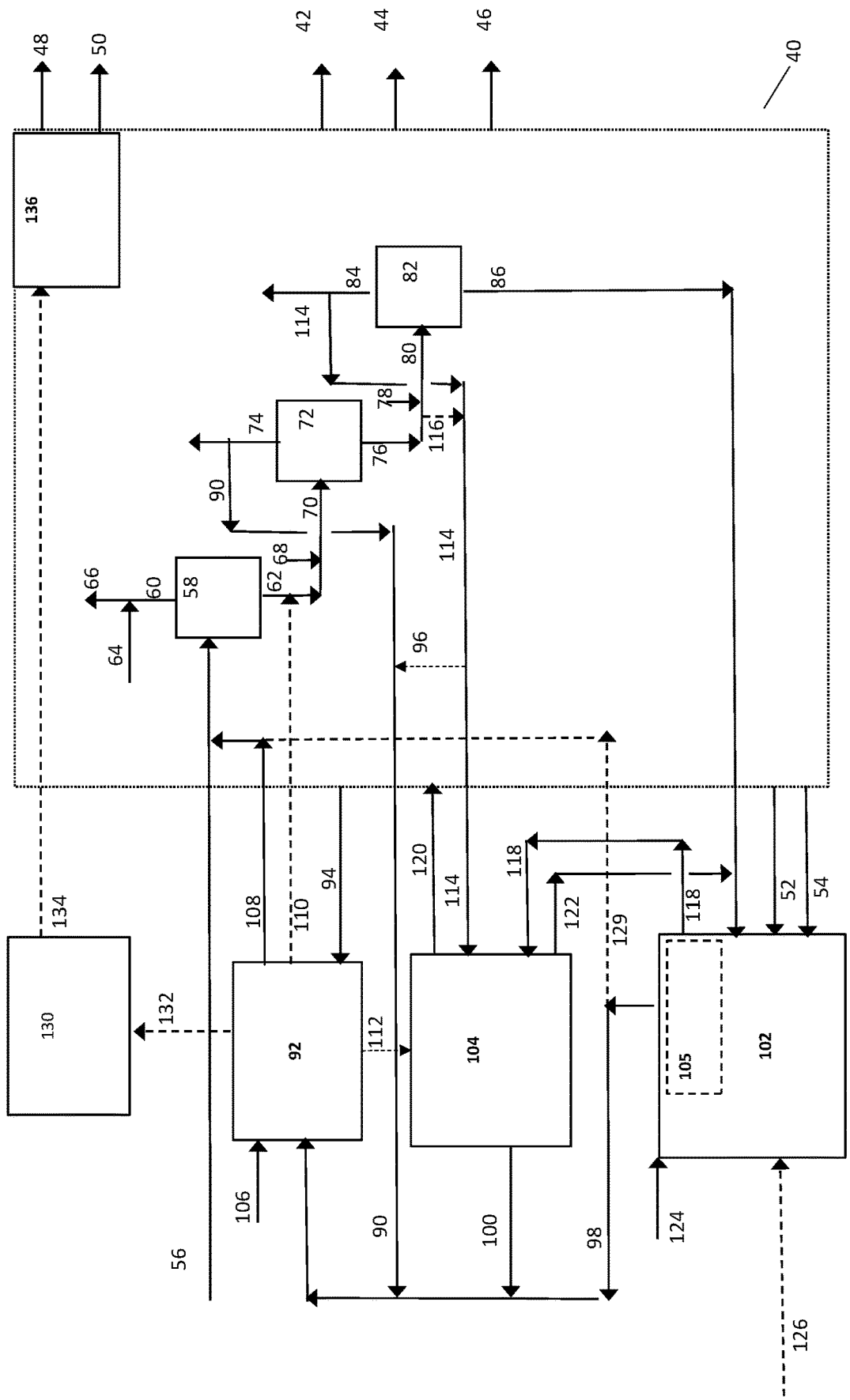
FIG. 5 is a simplified process flow diagram of a system for processing whole crudes and other heavy hydrocarbons according to embodiments herein.

As illustrated in FIG. 5, where like numerals represent like parts, the system may also include a catalytic reforming reaction zone 130 in some embodiments. Catalytic reforming zone 130 may convert a naphtha range feed 132 to a reformate 134 including aromatics, among other reactions and products, for example. Reformate 134 may then be fed to an aromatics unit 136 associated with the product recovery section of the steam cracker reaction zone 40.

As described above, embodiments herein may use three separation steps to provide feeds to the various reaction stages used to prepare steam cracker feeds. It is contemplated that, for some feeds, a single reaction stage may be appropriate, where the resulting light fraction may be fed to the pyrolysis reactor and/or a hydrocracker 92, and the heavies may be fed to either reaction zone 104 or 102, when only one is present. The economics and the investment cost may dictate the overall configuration that may be used for a given crude and location. Likewise, embodiments herein further contemplate use of two, four, or even five separation stages, separating the wide boiling range feedstock into desired fractions so that they may be appropriately prepared for thermal cracking and other downstream processing in accordance with embodiments herein.

As described briefly above, embodiments herein may allow for the direct cracking of crude oil to chemicals, forming light hydrocarbons like ethylene, propylene and light aromatics, in an economically viable manner, without passing through the conventional refining steps. Additionally, direct conversion of crude oil to chemicals may help close the widening supply-demand gap for key building blocks normally produced as co-products (propylene, butadiene) due to the increasing shift toward cracking lighter feedstock spurred by the shale gas revolution.

Integration of processing units according to embodiments herein may provide the unique potential for upgrading whole crudes, such as Arab Light crude, along with low value refinery streams, such as Pyrolysis Oil (PyOil), slurry oil and Light Cycle Oil (LCO), into higher value chemical products and aromatics complex feedstock.

Processes according to embodiments herein may be flexible for crudes with high levels of contaminants (sulfur, nitrogen, metals, CCR) and this distinguishes it from whole crude processes that can handle only very light crudes or condensates. As opposed to hydrotreating the whole crude that would involve very large reactor volumes and inefficient in terms of hydrogen addition, processes herein only add hydrogen as required and at the right point in the process.

Further, a carbon rejection step utilizing fluidized catalytic cracking significantly enhances the production of propylene while reducing hydrogen consumption. The FCC Main Fractionator can be used in the scheme to separate out the heaviest fraction of crude to be sent to the Residue Hydrocracking Unit.

Embodiments herein utilize a unique blend of pyrolysis convection and reaction zones for processing different types of feeds derived from selective hydrotreating and hydrocracking of crude components. Complete conversion of crude is achieved without a refinery.

Embodiments herein also use the first heater's convection section to separate light components that can be readily converted to olefins and do not need hydrotreating. The system further hydrotreats the liquids to remove heteroatoms that impact yield/fouling rate prior to further pyrolysis using a fixed bed catalyst system for HDM, DCCR, HDS and HDN, where ebullated bed or slurry hydrocracking catalyst systems may be used for conversion of the heaviest components in crude in an intermediate step, and a fixed bed hydrocracking system may convert the low density, aromatic products derived from conversion of the heaviest crude components to high hydrogen content products that can then be sent for pyrolysis.

Embodiments herein can vary the production of olefins such as ethylene or propylene based on demand shifts or reduce the conversion of crude to olefins in favor of aromatics. In another embodiment an olefins conversion unit can be added to make more propylene in the forward direction or more ethylene in the reverse direction. The heaviest unconverted fractions, if any, can be routed to a delayed coking unit. Products from the delayed coking unit can be comingled with FCC feed or thermal cracker feed.

Embodiments herein minimize the production of pyrolysis fuel oil by careful addition of hydrogen and by conducting the pyrolysis reaction in dedicated heaters tailored to the feed being processed. The pyrolysis oil is hydroprocessed within the different hydrocracking sections avoiding export of low value pyrolysis oil.

Embodiments herein and as described above have the advantages of: low capital cost; low energy consumption; low hydrogen consumption, because of the carbon rejection step; long on-stream factor; very high chemical yield; ability to change ratio of ethylene to propylene production; crude flexibility; no remaining low value streams. Embodiments herein are the only processes know to present inventors to include hydrogen addition and carbon rejection intimately integrated with steam cracking. Further, embodiments herein can vary the production of olefins such as ethylene or propylene based on demand shifts or reduce the conversion of crude to olefins in favor of aromatics.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for converting whole crudes and other wide boiling and/or heavy hydrocarbon streams to produce olefins and/or aromatics, the process comprising:
iteratively heating and separating a wide boiling range hydrocarbon stream comprising hydrocarbons boiling from naphtha range hydrocarbons to hydrocarbons having a normal boiling point temperature greater than 550° C., including:
heating the wide boiling range hydrocarbon stream and separating the heated wide boiling range hydrocarbon stream into a first vapor fraction and a first liquid fraction;
heating the first liquid fraction and separating the heated first liquid fraction into a second vapor fraction and a second liquid fraction; and
heating the second liquid fraction and separating the heated second liquid fraction into a third vapor fraction and a third liquid fraction;
thermally cracking the first vapor fraction;
hydrotreating and hydrocracking the second vapor fraction;
reacting the third vapor in a residue fluid catalytic cracking unit; and
converting hydrocarbons in the third liquid fraction in a residue hydrocracking system.

2. The process of claim 1, further comprising thermally cracking a portion of the second vapor fraction and thermally cracking a portion of the third vapor fraction.

3. The process of claim 2, further comprising separating the thermally cracked first, second, and third vapor fractions to recover two or more hydrocarbon fractions.

4. A method for processing whole crudes and other wide boiling and/or heavy hydrocarbon streams to produce olefins and/or aromatics, the method comprising:
transporting a wide boiling range hydrocarbon stream from a source, the wide boiling range hydrocarbon stream comprising hydrocarbons boiling from naphtha range hydrocarbons to hydrocarbons having a normal boiling point temperature greater than 550° C.;
heating the wide boiling range hydrocarbon stream and separating the heated wide boiling range hydrocarbon stream into a first vapor fraction and a first liquid fraction;
heating the first liquid fraction and separating the heated first liquid fraction into a second vapor fraction and a second liquid fraction;
heating the second liquid fraction and separating the heated second liquid fraction into a third vapor fraction and a third liquid fraction;
converting, with a radiant coil disposed in a radiant heating zone of one or more pyrolysis reactors, hydrocarbons in the first vapor fraction;
converting, in a hydrotreatment and hydrocracking zone, hydrocarbons in the second vapor fraction;
converting, with a residue fluid catalytic cracking system, hydrocarbons in the third vapor fraction;
converting, with a residue hydrocracking system, hydrocarbons in the third liquid fraction;
routing a product of the one or more pyrolysis reactors to the residue fluid catalytic cracking unit for processing; and
routing a product of the processing for use at the residue hydrocracking unit.

5. The method of claim 4, further comprising feeding an effluent from the hydrotreatment and hydrocracking reaction zone to an iterative heating and separation system.

6. The method of claim 4, further comprising:
separating an effluent from hydrotreatment and hydrocracking reactors in the hydrotreatment and hydrocracking zone; and
recovering a first light fraction and a first heavy fraction.

7. The method of claim 6, further comprising:
feeding the first heavy fraction to the residue fluid catalytic cracking system; and
feeding the first light fraction to an iterative heating and separation system.

8. The method of claim 6, further comprising recovering a naphtha range fraction.

9. The method of claim 8, further comprising converting, in a catalytic reforming zone, hydrocarbons in the naphtha range fraction to a reformate.

10. The method of claim 9, further comprising:
processing, in an aromatics unit, the reformate; and
recovering one or more aromatics product streams.

11. The method of claim 4, further comprising:
separating, with one or more reactors and a separation system of the residue fluid catalytic cracking system, an effluent from the one or more reactors; and
recovering a second light fraction and a second heavy fraction.

12. The method of claim 11, further comprising:
feeding the second light fraction to a fractionation system; and
feeding the second heavy fraction to the residue hydrocracking system.

13. The method of claim 4, further comprising:
separating an effluent from one or more hydrocracking reactors of the residue hydrocracking system; and
recovering a third light fraction and a third heavy fraction.

* * * * *